E. P. COWLES.
MOTOR VEHICLE.
APPLICATION FILED AUG. 6, 1912.
1,103,567.
Patented July 14, 1914.
3 SHEETS—SHEET 3.
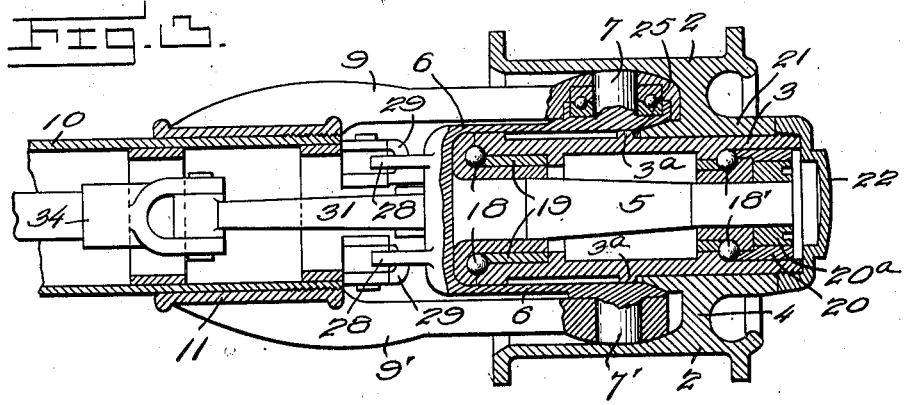
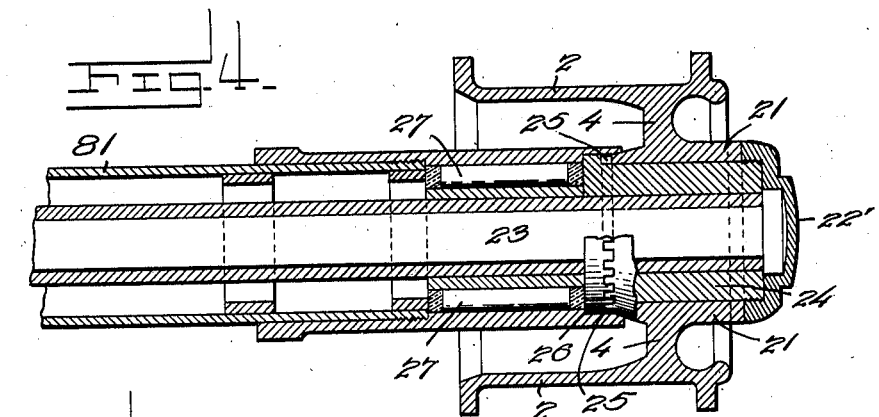
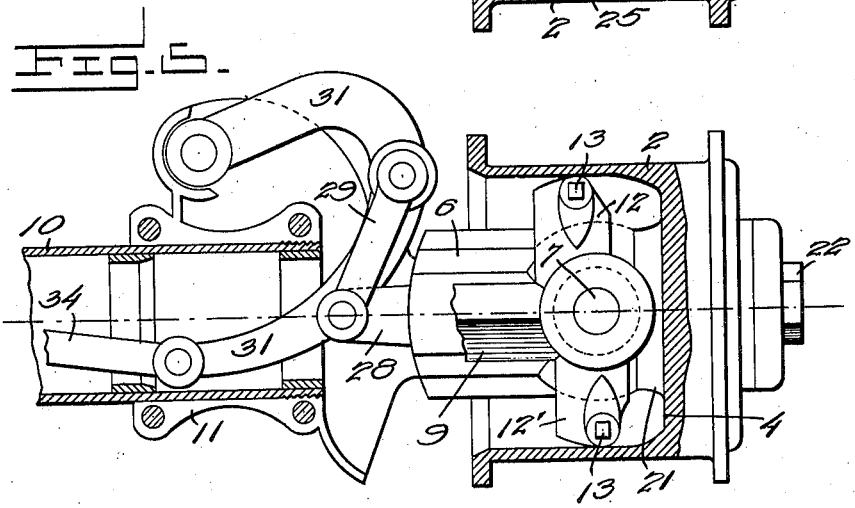
Witnesses
Inventor
Edward P. Cowles
by Foster Freeman Watson & Coit
Attorneys

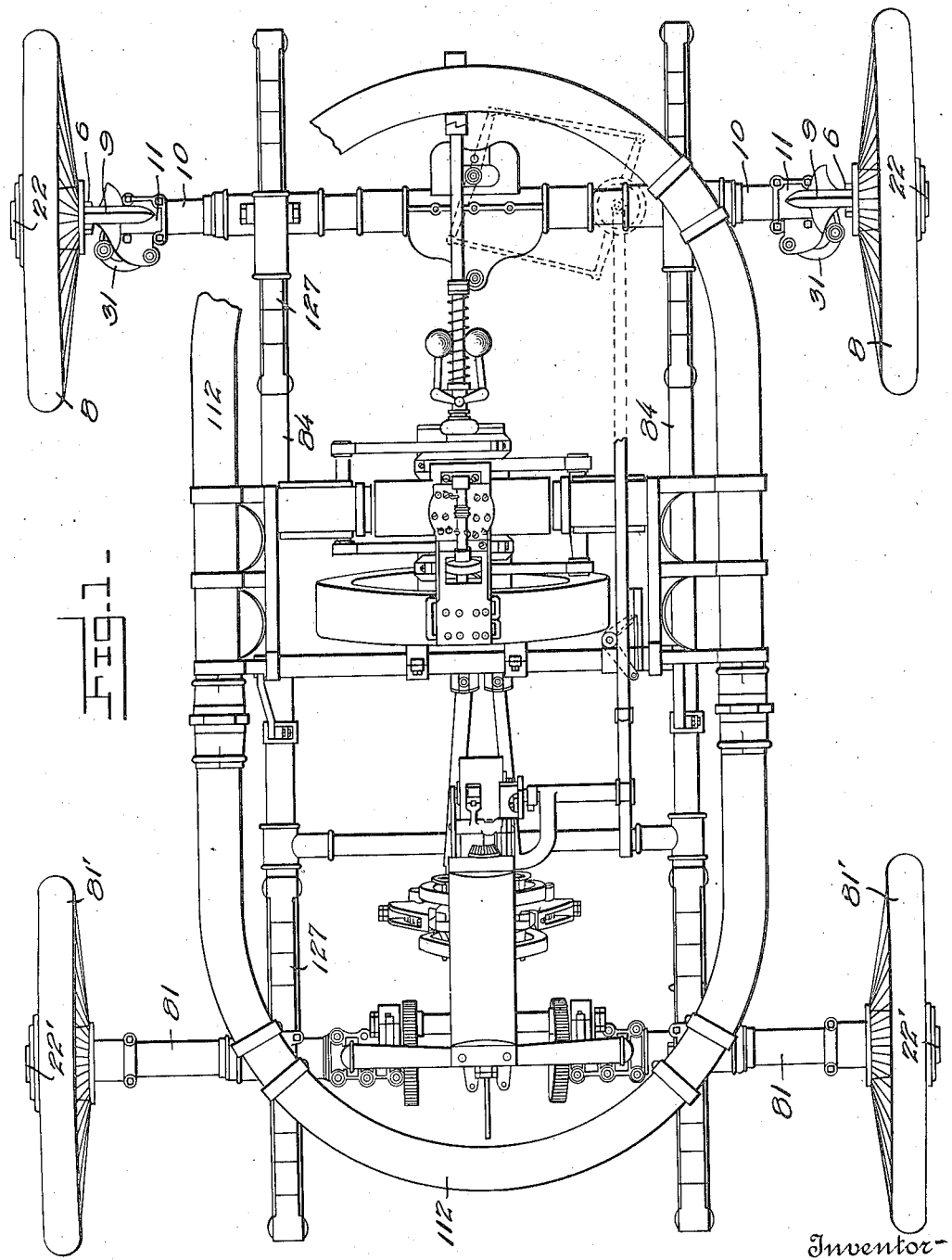

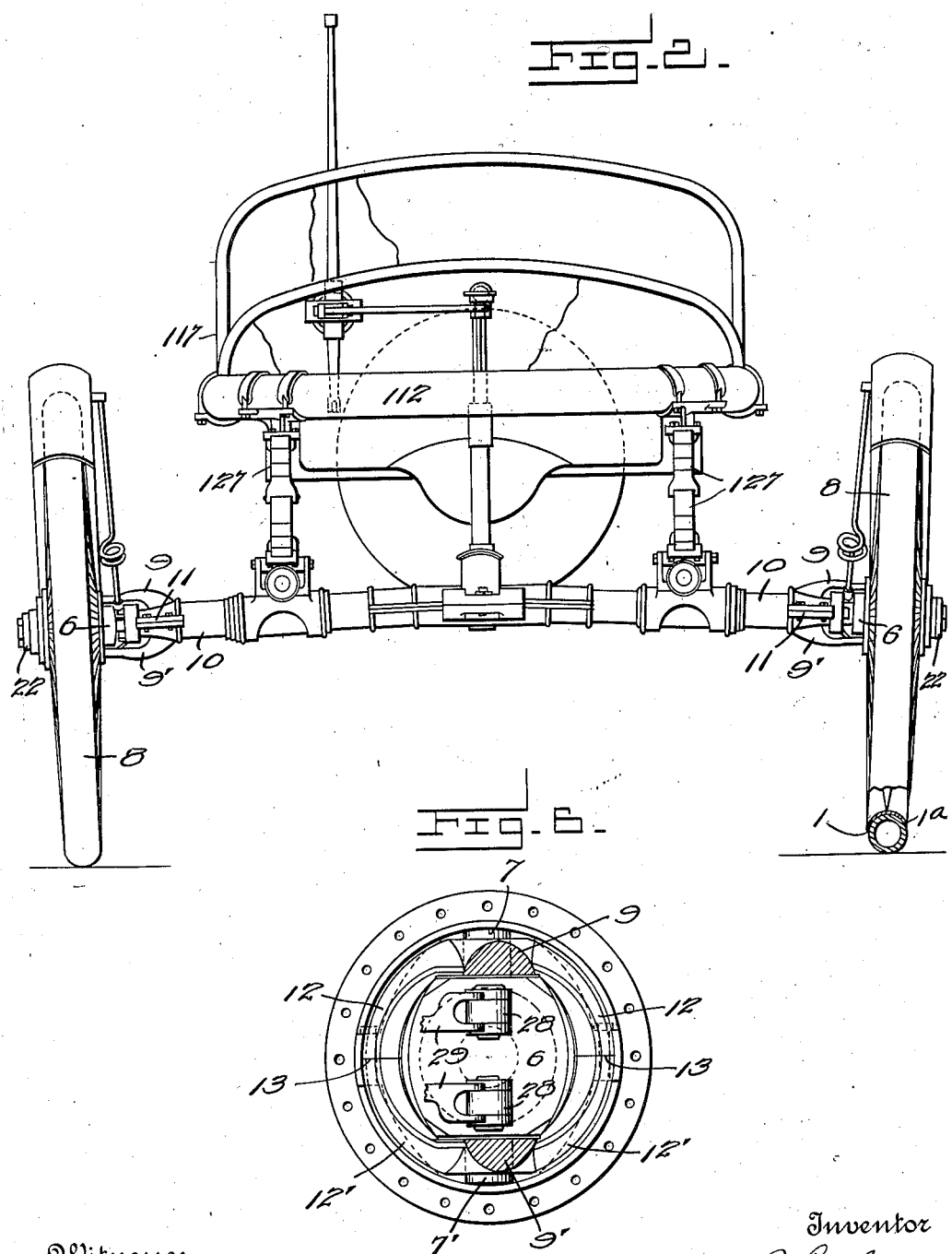

UNITED STATES PATENT OFFICE.

EDWARD P. COWLES, OF SPARTA, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,103,567.  Specification of Letters Patent.  Patented July 14, 1914.

Original application filed September 6, 1901, Serial No. 74,497. Divided and this application filed August 6, 1912. Serial No. 713,650.

*To all whom it may concern:*

Be it known that I, EDWARD P. COWLES, a citizen of the United States, residing at Sparta, in the county of Kent and State of Michigan, have invented certain new and useful Improvements in Motor-Vehicles, of which the following is a specification.

This application is a division of my application Serial No. 74,497, filed September 6, 1901.

My present invention relates to improvements in motor vehicles and particularly to the running gear and steering mechanism of such vehicles.

An object of the invention is to provide a light and strong steering hub the pivotal supports of which are arranged in the revolving plane of the wheel.

Another object is to provide front and rear wheel hubs so constructed as to permit of a convenient and quick interchange of wheels or the substitution of a spare wheel for a disabled one.

With these and other objects in view, the invention consists in the construction and arrangement of parts described in the following specification, reference being had to the accompanying drawings, in which, Figure 1 is a plan view, partly broken away, of a motor vehicle in which power is applied to the rear wheels only; Fig. 2 is a view of the front end of said vehicle, partly broken away; Fig. 3 is a vertical section through one of the steering wheel hubs and a portion of the axle; Fig. 4 is a similar view through one of the driving hubs; Fig. 5 is a view showing the steering hub illustrated in Fig. 3, partly in section, a portion of the shaft in section, and the connecting mechanism in plan; and Fig. 6 is an inner end view of the hub shown in Fig. 5.

Like parts are identified by the same reference numerals throughout the several views.

In the drawings there is illustrated a motor vehicle comprising a suitable body 117 on frame 112 supported on springs 127 on front axle 10 and rear axle 81. The axles are "cambered" or arched and are connected by reach bars 84 and supported on front steering wheels 8 and rear driving wheels 81'.

The steering wheels illustrated in the drawings are of that form or type in which the main axle or wheel support is fixed and the wheel is adapted to turn, to guide the vehicle, on joints or "steering knuckles" arranged at or near the central revolving plane of the wheel. This form of steering knuckle with the type of bearings hereinafter described and the slight camber given to the axles or steering spindles, makes a very strong construction of comparatively light weight.

The rear wheels of an automobile by reason of their function of both driving and carrying the most weight are much more subject to wear and liable to be disabled than the front wheels, and it often happens that a rear wheel tire which has become so much worn that it would soon be useless on a driving wheel would last indefinitely on a front or steering wheel. It is a great advantage therefore to have steering and driving wheels interchangeable. I accomplish this desirable end by making all of the wheel hubs substantially similar, and by providing hub receiving members for the front steering axle and the rear driving axle respectively, with parts of similar exterior form, so that the wheels may be removably mounted interchangeably on the front and rear axles.

Referring to the drawings, it will be seen that the wheel hubs for the front and rear axles are similar, being shown as composed of a hollow cylinder 2 adapted to receive the wheel spokes, which can be of wire, as shown, or of any other suitable material, and a boss or part 21 connected to the cylinder part 2 by a web 4. This boss or part 21 of the wheel hub is bored out the same on all of the wheels of the vehicle so that it will interchangeably fit upon the hub receiving members of both axles, as hereinafter more fully described.

The hub receiving member for the front or steering axle 10 is shown in Fig. 3 in the form of a cylinder or sleeve 3 rotatably mounted on the spindle 5 and is arranged for steering and not for driving. Said sleeve has an external bearing surface adapted to receive the wheel hub as above suggested, and it is also formed with projections 3ª approximately midway of its length. Each of the wheel hubs also has parts such as teeth or projections 25 formed as shown on the boss or part 21 adjacent the middle part of the hub to fit the projections 3ª on the hub receiving member.

The hub receiving member for the rear or driving axle 81 is shown in Fig. 4 in the form of a spool or cylinder 24, and is arranged for driving and not for steering, being suitably connected with a driving shaft 23 rotatably arranged within said axle 81. The driving shaft or axle 23 may as shown have its outer end enlarged by this spool or cylinder 24 and the exterior thereof is accurately the same as the external bearing surface of the hub receiving member of the front axle, so that the boss 21 of any wheel will fit either the cylinder 3 or the spool 24. The rotating motion of the driving axle 23 may be transmitted to the wheel hub by a feather or key, or any other suitable means, but I prefer to provide the inner end of the spool 24 adjacent the roller bearings 27 with a flange or shoulder 26 which is provided on its outer face with a series of teeth or projections similar to the teeth or projections 3ª on the cylinder 3, adapted to engage with the teeth or projections 25 on the boss 21 of the hub, and which are engaged by the teeth 3ª when the hub is applied to the steering axle.

A cap nut 22 for the front axle and a similar nut 22' for the rear axle, hold the wheels on the hub receiving members with their teeth in engagement with the teeth on the cylinder 3 and the boss 24, respectively, thus retaining the detachable hubs firmly in place. By simply removing the nuts 22, 22' the wheels can be interchanged or in case of extended journeys an extra wheel carried on the carriage can be quickly and conveniently put on to replace a disabled one, without disturbing the ball or roller bearings in any way.

The hub receiving member on the front axle, hereinbefore described, is adapted to any kind of bearing, but I preferably use a combined ball and plain bearing, as shown particularly in Fig. 3. The ball bearings 18, 18' are of the usual form, except that the inner bearing is larger than the outer to take care of the greater leverage at that point and to fit the larger circumference of the stepped axle journal or spindle 5. The cylinder 3 of the hub has a bronze ring or sleeve 19 fitted therein near its inner end, which sleeve bears against the surface of the axle 5 or the ball race sleeve which surrounds the axle. A jam nut 20ª retains both bearings in place and thereby holds the hub receiving member on the axle. The cylinder 3 extends beyond the end of the spindle 5 and thus the jam nut 20ª is arranged wholly within the end of the cylinder. About the ball race 18' and the jam nut is fitted another bronze ring 20 which contacts with the inner surface of the outer end of the cylinder 3. The plain bearings ordinarily are inoperative but under great strains they assist the ball bearings and when either or both ball bearings are disabled the plain bearings will do all the work. The ring 20 and the jam nut 20ª also effectually close the outer end of the cylinder to prevent dirt getting into the bearings when changing outer hubs 2 as will be hereinafter described.

Referring particularly to Fig. 3 of the drawings, the steering spindle or axle journal 5 has a base portion 6, which is formed in the cup shape shown, extending entirely around the axle and into the hub between the two cylinders 2, 3. At its free end this cup shaped member is provided with two short trunnions 7, 7', arranged diametrically opposite each other and in the same vertical plane, their axes being in or near the central plane of rotation of the wheel 8. The said trunnions 7, 7', extend into and have bearings in eyes formed in the upper and lower arms or branches 9, 9', of a fork which is attached to the end of the stationary or fixed axle 10 by a divided socket 11. It is obvious that by this construction the wheel 8, while being held rigidly upright is free to turn laterally on a nearly vertical axis which lies approximately in the central plane of rotation of the wheel, and that the tendency of the wheel to be deflected from its proper course by contact with obstructions is reduced to a minimum. By making axle 10 "arched" or "cambered" the trunnions or spindles 5 are arranged in planes at slight angles to the horizontal and the revolving planes of the wheels "stand out" more nearly radial to the usual curved section of the road bed. Since, as will be hereinafter described in detail, I place the larger and stronger of the bearings of the steering wheels inwardly of their revolving planes, this arched or cambered construction brings the tread of the wheel at the point of contact with the ground approximately in vertical alinement with these larger bearings.

The forks 9, 9', are provided at their free ends with arms 12, 12', respectively, which extend about the cup shaped portion 6 of the axle and are bolted together at 13 where they meet in the central horizontal plane of the axle. By this arrangement the fork can be made very light and have abundance of strength.

The above construction makes a strong steering knuckle inside of the wheel hub with a sufficiently long pivot to give the wheel stability and to make the steering knuckle very compact and light, without materially increasing the diameter of the hub over that ordinarily employed. This improved form of hub is also of advantage in that the roller bearing 27 of the driving axle can be extended inside the hub of the driving wheel well toward the center thereof thus relieving the driving axle 23 of much strain in carrying the weight of the vehicle.

It will be understood that the axle journal or trunnion 5 may be oscillated by any suitable steering mechanism which may be connected to arms 28 or other means provided for that purpose. In Fig. 5 I have illustrated a steering mechanism which comprises link 34, lever 31 and links 29. For further description of this operating mechanism and of the other parts of the vehicle shown but not claimed herein, reference may be had to my co-pending application No. 74,497.

Having thus described my invention, what I claim and desire to secure by Letters-Patent is:

1. In a motor vehicle, the combination with the front axle and the spindle pivoted thereto, of a wheel on said spindle, two independent bearings interposed between said spindle and the hub of said wheel adjacent the ends of the spindle, said bearings being of different sizes, the larger being mounted at the base end of the spindle, and one of said bearings being located approximately in vertical alinement with the point of contact of the tread of said wheel with the ground while the other of said bearings is located out of line therewith, and a single adjusting means for retaining both bearings in position.

2. In a motor vehicle, the combination with the front axle, the spindle pivoted thereto to swing in a plane at a slight angle to the horizontal, a large bearing mounted at the base end of said spindle, and a smaller bearing mounted at the outer end of said spindle, of a wheel having a hub mounted on said bearings, the rim of the wheel being so constructed and located relative to the hub, and the spindle being so inclined, that the tread of the wheel at the point of contact with the ground is approximately vertically in line with one, and out of line with the other, of said bearings.

3. In a motor vehicle, the combination with the front axle, the spindle pivoted thereto to swing in a plane at a slight angle to the horizontal, a large bearing mounted at the base end of said spindle, and a smaller bearing mounted at the outer end of said spindle, of a wheel having a hub mounted on said bearings, the rim of the wheel being so constructed and located relative to the hub, and the spindle being so inclined, that the tread of the wheel at the point of contact with the ground is approximately vertically in line with the larger of said bearings.

4. In a motor vehicle, the combination with the front axle, the stepped spindle pivoted thereto, a large bearing mounted at the base end of said spindle, and a smaller bearing mounted at the outer end of said spindle, of a wheel having a hub mounted on said bearings and inclined so that the point of contact of the tread thereof with the ground is approximately vertically in line with the inner and larger of said bearings.

5. In a motor vehicle, the combination with a stationary axle, of a wheel having a hub formed of two concentric tubular members detachably connected together, the spokes of the wheel being attached directly only to the outer of said members and the inner hub member engaging suitable bearings, whereby the wheel and outer hub member may be removed without moving or affecting the said bearings, vertical trunnions supported from the axle and arranged between said concentric members of the hub, and means for adjusting the wheel about the axis of said trunnions.

6. In a motor vehicle, the combination with the front axle and the spindle pivoted thereto, of a wheel on said spindle, two independent bearings interposed between said spindle and the hub of said wheel adjacent the ends of the spindle, and one of said bearings being located approximately in vertical alinement with the point of contact of the tread of the wheel with the ground, and a single adjusting means for retaining both bearings in position.

7. In a motor vehicle, the combination with a front and a rear stationary axle, of a steering spindle pivoted at the end of the front axle, a hub-receiving member surrounding and freely rotatable upon said spindle, a driven hub-receiving member at the end of said rear axle, and wheels having hubs adapted to be removably secured, interchangeably, to said hub receiving members.

8. In a motor vehicle, the combination with a front and a rear stationary axle, of a steering spindle pivoted at the end of the front axle, a hub-receiving member surrounding and freely rotatable upon said spindle and having teeth or projections, a driven hub-receiving member at the end of said rear axle and having teeth or projections, and wheels having hubs adapted to be removably secured, interchangeably, to said hub receiving members, and having teeth or projections adapted to fit the teeth or projections on said hub-receiving members.

9. In a motor vehicle, the combination with the front and rear stationary axles, of steering spindles pivoted at the ends of the front axle, hub receiving members surrounding and rotatably mounted on said spindles, a driving shaft rotatably arranged within said rear stationary axle, hub receiving members at the ends of said rear axle and connected to be driven by said driving shaft, and wheels having hubs adapted to be removably secured, interchangeably, to said hub receiving members.

10. In a motor vehicle, the combination with a front and a rear stationary axle, of a steering spindle pivoted at the end of the front axle, a hub receiving member surrounding said spindle, anti-friction bearings between the member and spindle, a driven hub-receiving member at the end of said rear axle, anti-friction supporting bearings for said rear stationary axle, and wheels having hubs adapted to interchangeably fit on said hub receiving members and readily removable therefrom without removing or exposing said anti-friction bearings.

11. In a motor vehicle, the combination with the front and rear stationary axles, of steering spindles pivoted at the ends of the front axle, hub-receiving members surrounding said spindles, anti-friction bearings between the members and spindles, a driving shaft arranged within said rear stationary axle, hub-receiving members at the ends of said rear axle and connected to be driven by said driving shaft, anti-friction supporting bearings for said rear stationary axle, and wheels having hubs adapted to interchangeably fit on said hub receiving members and readily removable therefrom without removing or exposing said anti-friction bearings.

12. In a motor vehicle, the combination with an axle spindle having a roller bearing including a race mounted on the axle, of a hub receiving member mounted on said roller bearing, a nut on the axle for retaining said race in position, means coaxial with said axle and engaging the inner surface of said hub receiving member for excluding dirt from said bearing, a wheel having a hub removably mounted on said hub receiving member, and means removable without disturbing said nut or removing said dirt excluding means from the hub receiving member, for retaining said wheel on the hub receiving member.

13. In a motor vehicle, the combination with an axle spindle having a roller bearing including a race mounted on the axle, of a hub receiving member mounted on said roller bearing, a nut on the axle for retaining said race in position, means coaxial with said axle and engaging the inner surface of said hub receiving member for excluding dirt from said bearing, a wheel having a hub removably mounted on said hub receiving member, and means, removable without disturbing said nut or removing said dirt excluding means from the hub receiving member, for retaining said wheel on the hub receiving member, said wheel retaining means forming a closure for the outer end of said wheel hub.

14. In a motor vehicle, the combination with an axle and a steering spindle pivoted thereto, of a hub receiving member rotatably mounted on said spindle and extending beyond the end thereof, means wholly within said member for retaining said member on the spindle, a wheel having a hub adapted to be fitted upon and readily removed from said member, and means surrounding the extended end of said member for retaining said wheel thereon.

15. In a motor vehicle, the combination with an axle, of a hub receiving member rotatably mounted thereon and extending beyond the end thereof, said hub receiving member having an external bearing surface for a hub and having teeth or projections approximately midway of its length, means wholly within said member for retaining the member on the axle, a wheel hub removably mounted on said hub receiving member and bearing on said external bearing surface, said hub also having parts adjacent its middle adapted to fit said teeth or projections, and means adapted to retain the hub on the member with said teeth or projections in engagement with said parts.

16. In a motor vehicle, in combination, stationary front and rear axles, steering spindles pivoted to the front axle, hub receiving members surrounding said spindles, roller bearings between said members and spindles, a driving shaft within said rear axle, hub receiving members having driving connection with said driving shaft, roller bearings at the outer ends of the stationary rear axle through which the latter is supported by said hub receiving members, wheels having hubs adapted to interchangeably fit said hub receiving members and adapted to be fitted upon and readily removed from said members without disturbing the bearings, and means for rigidly and removably securing said wheels to said hub receiving members.

17. In a motor vehicle, in combination, stationary front and rear axles, steering spindles pivoted to the front axle, hub receiving members surrounding said spindles, roller bearings between said members and spindles, a driving shaft within said rear axle, hub receiving members having driving connection with said driving shaft, roller bearings at the outer ends of the stationary rear axle through which the latter is supported by said hub receiving members, wheels having hubs adapted to interchangeably fit said hub receiving members and adapted to be fitted upon and readily removed from said members without disturbing the bearings, and means, for each of said axles, secured to said hub receiving members, adapted to engage the wheel hubs to removably secure said wheels to said hub receiving members.

18. In a motor vehicle, in combination, stationary front and rear axles, steering spindles pivoted to the front axle, hub receiving members surrounding said spindles and having teeth or projections, roller bearings between said members and spindles, a driving shaft within said rear axle and projecting beyond the ends thereof, roller bearings between the driving shaft and the stationary rear axle adjacent the outer ends of the latter, hub receiving members secured upon the projecting ends of the driving shaft and having teeth or projections, wheels having hubs adapted to interchangeably fit said hub receiving members and adapted to be fitted upon and readily removed from said members without disturbing the bearings, said hubs having teeth or projections adapted to fit the teeth or projections on said hub receiving members, and means for retaining the hubs on the hub receiving members with the teeth or projections in inter-engagement.

In testimony whereof I affix my signature in presence of two witnesses.

EDWARD P. COWLES.

Witnesses:
 BERT BEST,
 IVAN L. SMITH.